United States Patent

Liu

(10) Patent No.: US 10,484,830 B1
(45) Date of Patent: Nov. 19, 2019

(54) INDOOR POSITIONING SYSTEM FOR FIREMAN

(71) Applicant: Man-Chee Liu, Taipei (TW)

(72) Inventor: Man-Chee Liu, Taipei (TW)

( * ) Notice: Subject to any disclaimer, the term of this patent is extended or adjusted under 35 U.S.C. 154(b) by 0 days.

(21) Appl. No.: 16/152,013

(22) Filed: Oct. 4, 2018

(30) Foreign Application Priority Data

Jul. 13, 2018 (TW) .............................. 107209480 U

(51) Int. Cl.
*H04W 4/33* (2018.01)
*H04W 4/029* (2018.01)
*G06K 7/10* (2006.01)

(52) U.S. Cl.
CPC ........ *H04W 4/029* (2018.02); *G06K 7/10366* (2013.01); *H04W 4/33* (2018.02)

(58) Field of Classification Search
CPC ........ H04W 64/00; H04W 48/10; H04W 4/80
USPC ................... 455/456.1, 456.2; 340/6.1, 10.1
See application file for complete search history.

(56) References Cited

U.S. PATENT DOCUMENTS

| | | | |
|---|---|---|---|
| 2011/0156870 A1* | 6/2011 | Attew | G01S 5/14 340/10.1 |
| 2016/0254844 A1* | 9/2016 | Hull | H04B 5/0062 340/6.1 |

* cited by examiner

*Primary Examiner* — Sam Bhattacharya
(74) *Attorney, Agent, or Firm* — Guice Patents PLLC

(57) ABSTRACT

An indoor positioning system for fireman includes: a wireless tag reading device, worn or carried by a fireman; and a plurality of wireless tags, disposed in a plurality of positioning points defined in an indoor space and each of the wireless tags having a memory for storing a location data, where each of the location data is corresponding to one of the plurality of positioning points; when in use, the wireless tag reading device is coupled with at least one of the plurality of wireless tags within a sensing range via a wireless means, so that at least one of the location data corresponding to at least one positioning point defined in the indoor space is obtained.

6 Claims, 3 Drawing Sheets

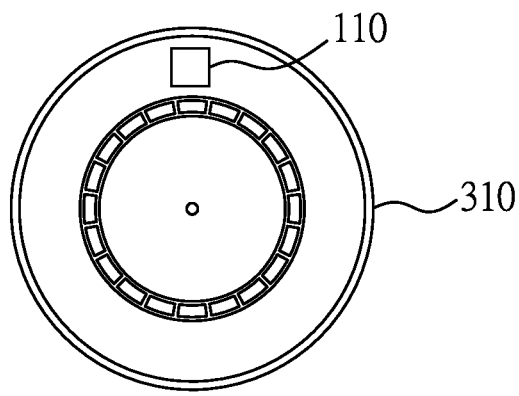
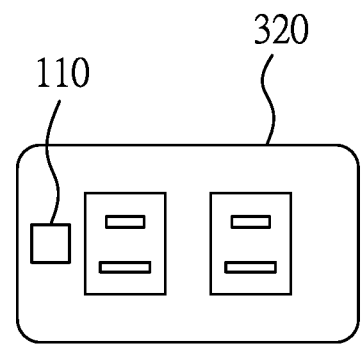
FIG. 3
FIG. 4
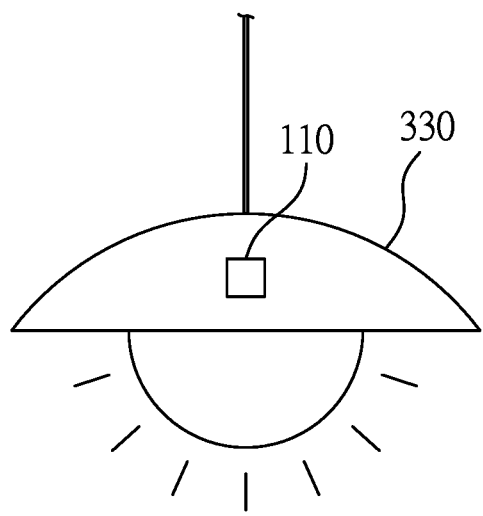
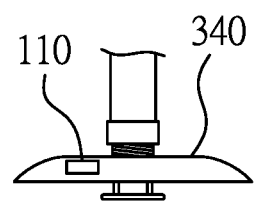
FIG. 5
FIG. 6

INDOOR POSITIONING SYSTEM FOR FIREMAN

BACKGROUND OF THE INVENTION

1. Field of the Invention

The present invention relates to an indoor positioning system for fireman.

2. Description of Related Art

When a building is on fire, there may be no electricity available inside the building and smoke would occupy most of the indoor space, so that a fireman is unable to clearly identify his/her current location inside the building.

To solve the above-mentioned problem, the fireman needs a positioning device for identifying his/her current location.

The global positioning system (GPS) can provide a positioning function in an opened space, but the above-mentioned function cannot be applied in an indoor space.

To solve the indoor positioning problem, the Apple Inc. has launched the iBeacon positioning project in 2013. The positioning project utilizes a signal emitter to continuously emitting signals, when a mobile phone is within a coverage range of the signal emitter, a string of code is sent by the signal emitter to the mobile phone for enabling the mobile phone to be provided with a positioning data.

However, during a fire accident, the signal emitter of the iBeacon would very likely stop its operation because there is no electricity, and the fireman is unable to obtain the positioning data when he/she is in the indoor space.

To solve the above-mentioned problems, a novel indoor positioning system for fireman shall be developed by skilled persons in the art.

SUMMARY OF THE INVENTION

One primary objective of the present invention is to provide an indoor positioning system for fireman, in which a plurality of wireless tags are disposed in positioning points, so that a fireman can be assisted to confirm his/her location in an indoor space.

Another objective of the present invention is to provide an indoor positioning system for fireman, in which a wireless tag can be disposed on a smoke detector, a socket, a lamp or a water sprinkler which has already been installed in an indoor space, so that a fireman can be assisted to confirm his/her location in an indoor space.

To achieve the objectives, one technical solution provided by the present invention is to provide an indoor positioning system for fireman, which includes:

a wireless tag reading device, worn or carried by a fireman; and a plurality of wireless tags, disposed in a plurality of positioning points defined in an indoor space and each of the wireless tags having a memory for storing a location data, wherein each of the location data is corresponding to one of the plurality of positioning points;

wherein, when in use, the wireless tag reading device is coupled with at least one of the plurality of wireless tags within a sensing range via a wireless means, so that at least one of the location data corresponding to at least one positioning point defined in the indoor space is obtained.

According to one embodiment provided by the present invention, the wireless tag reading device has a displayer and/or a speaker.

According to one embodiment provided by the present invention, the wireless tag reading device has a button unit and/or a touch control unit.

According to one embodiment provided by the present invention, the wireless tag reading device has a communication interface.

According to one embodiment provided by the present invention, the positioning point is located on a smoke detector.

According to one embodiment provided by the present invention, the positioning point is located on a socket.

According to one embodiment provided by the present invention, the positioning point is located on a lamp.

According to one embodiment provided by the present invention, the positioning point is located on a water sprinkler.

BRIEF DESCRIPTION OF THE DRAWINGS

The present invention will be apparent to those skilled in the art by reading the following detailed description of a preferred embodiment thereof, with reference to the attached drawings, in which:

FIG. 3 is a schematic view illustrating a wireless tag being disposed on a smoke detector according to the present invention;

FIG. 4 is a schematic view illustrating the wireless tag being disposed on a socket according to the present invention;

FIG. 5 is a schematic view illustrating the wireless tag being disposed on a lamp according to the present invention; and FIG. 6 is a schematic view illustrating the wireless tag being disposed on a water sprinkler according to the present invention.

DETAILED DESCRIPTION OF THE PREFERRED EMBODIMENT

Figure 1:
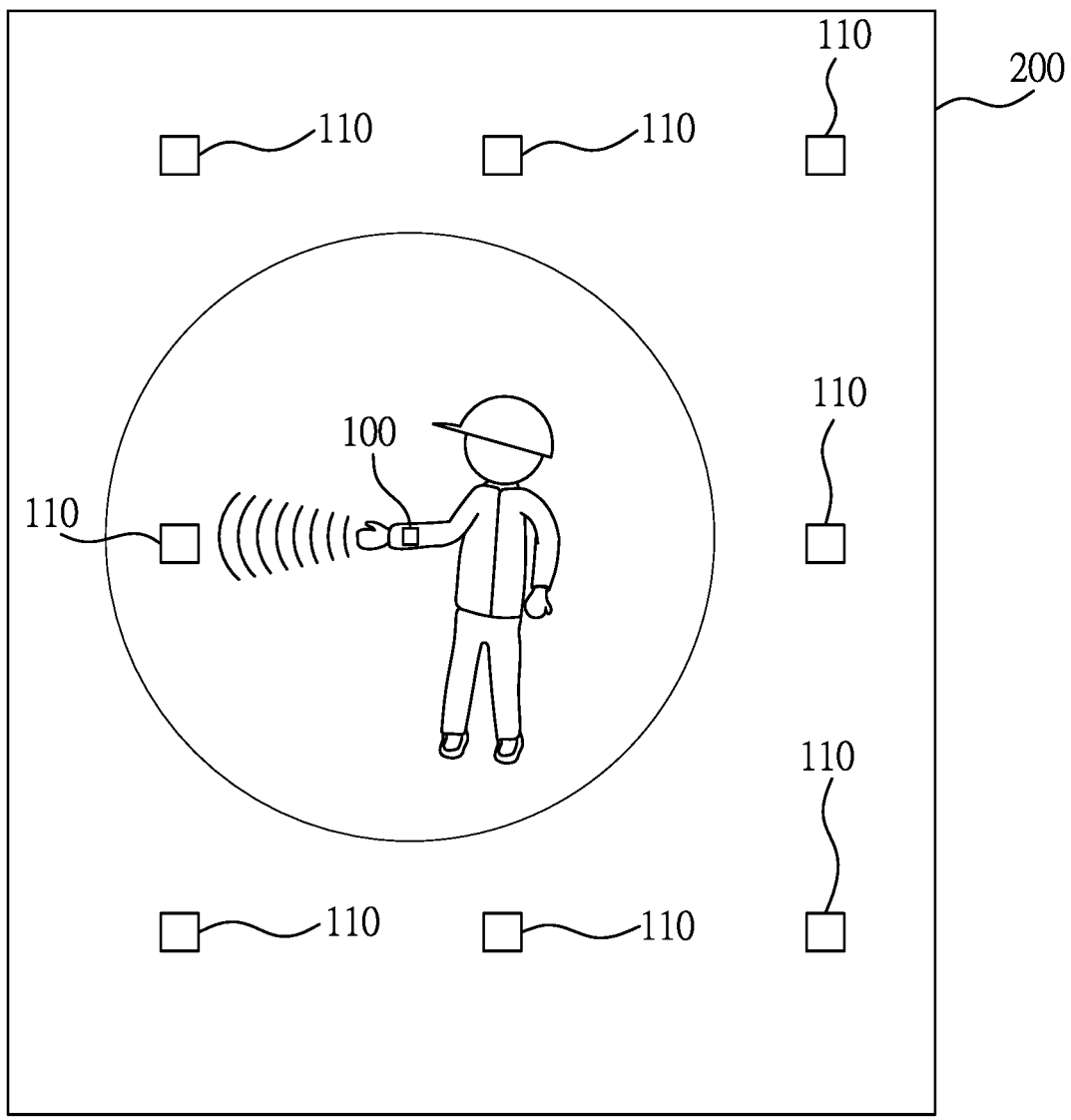
FIG. 1 is a schematic view illustrating an indoor positioning system for fireman according to one embodiment of the present invention.

Please refer to FIG. 1, which is a schematic view illustrating an indoor positioning system for fireman according to one embodiment of the present invention. As shown in FIG. 1, the indoor positioning system for fireman includes a wireless tag reading device 100 and a plurality of wireless tags 110.

The wireless tag reading device 100 is worn or carried by a fireman, and the wireless tags 110 are disposed in a plurality of positioning points defined in an indoor space 200. Each wireless tag 110 can be in an active status or a passive status, and has a memory (not shown in FIG. 1) for storing a location data, wherein each of the location data is corresponding to one of the plurality of positioning points.

When in use, the wireless tag reading device 100 is coupled with at least one of the wireless tags 110 within a sensing range d via a wireless means, so that at least one of the location data corresponding to at least one positioning point defined in the indoor space 200 can be obtained.

Figure 2:
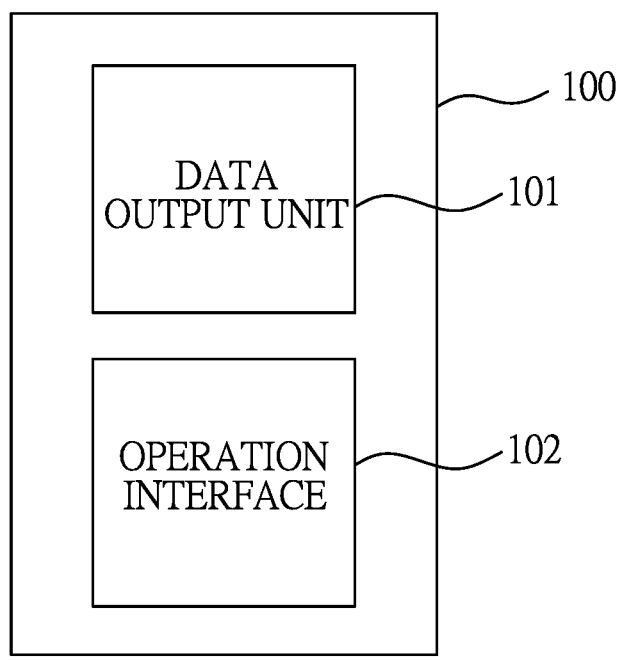
FIG. 2 is a block diagram view illustrating a wireless tag reading device of the indoor positioning system for fireman shown in FIG. 1 according to one embodiment of the present invention.

Please refer to FIG. 2, which is a block diagram view illustrating the wireless tag reading device 100 of the indoor positioning system for fireman shown in FIG. 1, according to one embodiment of the present invention. As shown in FIG. 2, the wireless tag reading device 100 has a data output unit 101 and an operation interface 102.

The data output unit 101 includes a displayer and/or a speaker.

The operation interface 102 includes a button unit and/or a touch control unit.

Moreover, the wireless tag reading device 100 further includes a communication interface used for transmitting the location data to an external device.

According to the present invention, the wireless tag 110 can be disposed in any existed indoor device or equipment. Please refer from FIG. 3 to FIG. 6, wherein FIG. 3 is a schematic view illustrating the wireless tag 110 being disposed on a smoke detector 310 according to the present invention; FIG. 4 is a schematic view illustrating the wireless tag 110 being disposed on a socket 320 according to the present invention; FIG. 5 is a schematic view illustrating the wireless tag 110 being disposed on a lamp 330 according to the present invention; and FIG. 6 is a schematic view illustrating the wireless tag 110 being disposed on a water sprinkler 340 according to the present invention Based on what has been disclosed above, advantages achieved by the present invention are as followings:

(1) The indoor positioning system for fireman provided by the present invention can assist a fireman to confirm his/her location in the indoor space through the wireless tags disposed in the positioning points.

(2) According to the indoor positioning system for fireman provided by the present invention, the wireless tag can be disposed on the smoke detector, the socket, the lamp or the water sprinkler, which has already been installed in the indoor space, so that the fireman can be assisted to confirm his/her location in the indoor space.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. An indoor positioning system for fireman, including:
   a wireless tag reading device, worn or carried by a fireman, said wireless tag reading device has a data output unit and an operation interface, said data output unit is selected from a group consisting of a display, a speaker, or a combination thereof, and said operation interface is selected from a group consisting of a button unit, a touch control unit, or a combination thereof; and
   a plurality of wireless tags, disposed in a plurality of positioning points defined in an indoor space and each said wireless tag having a memory for storing a location data, wherein each said location data is corresponding to one of said plurality of positioning points;
   wherein, when in use, said wireless tag reading device is coupled with at least one of said plurality of wireless tags within a sensing range via a wireless means, so that at least one said location data corresponding to at least one said positioning point defined in said indoor space is obtained.

2. The indoor positioning system for fireman as claimed in claim 1, wherein said wireless tag reading device has a communication interface.

3. The indoor positioning system for fireman as claimed in claim 1, wherein one of said plurality of positioning points is located on a smoke detector.

4. The indoor positioning system for fireman as claimed in claim 1, wherein one of said plurality of positioning points is located on a socket.

5. The indoor positioning system for fireman as claimed in claim 1, wherein one of said plurality of positioning points is located on a lamp.

6. The indoor positioning system for fireman as claimed in claim 1, wherein one of said plurality of positioning points is located on a water sprinkler.

* * * * *